United States Patent
Lin et al.

(10) Patent No.: US 10,082,577 B2
(45) Date of Patent: Sep. 25, 2018

(54) IMAGE RANGING SYSTEM, LIGHT SOURCE MODULE AND IMAGE SENSING MODULE

(71) Applicant: Industrial Technology Research Institute, Hsin-Chu (TW)

(72) Inventors: Chun-Ting Lin, Taipei (TW); Chen-Chin Cheng, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 357 days.

(21) Appl. No.: 14/982,527

(22) Filed: Dec. 29, 2015

(65) Prior Publication Data
US 2017/0131403 A1     May 11, 2017

(30) Foreign Application Priority Data
Nov. 9, 2015   (TW) ............................... 104136882 A

(51) Int. Cl.
*G01S 17/08*     (2006.01)
*G01S 7/481*     (2006.01)
(Continued)

(52) U.S. Cl.
CPC ............ *G01S 17/08* (2013.01); *G01S 7/4814* (2013.01); *G01S 17/89* (2013.01); *G06F 3/017* (2013.01)

(58) Field of Classification Search
CPC .................................. G01C 3/08; G01C 25/00
See application file for complete search history.

(56) References Cited

U.S. PATENT DOCUMENTS 8,462,318 B2   6/2013 Hsu et al.
8,705,049 B2   4/2014 Honma et al.
(Continued)

FOREIGN PATENT DOCUMENTS

CN     101473167 A     7/2009
GB     2276997         10/1994
(Continued)

OTHER PUBLICATIONS

Reinhard Koch et al. "MixIn3D: 3D Mixed Reality with ToF-Camera," In Proceedings of the DAGM 2009 Workshop on Dynamic 3D Imaging (Dyn3D '09), Kiel, Germany, pp. 126-141. DOI=http://dx.doi.org/10.1007/978-3-642-03778-8_1.

Benjamin Huhle et al. "On-the-fly scene acquisition with a handy multi-sensor system," International Journal of Intelligent Systems Technologies and Applications, 2008 5:3-4, 255-263, DOI: http://dx.doi.org/10.1504/IJISTA.2008.0212388.

(Continued)

*Primary Examiner* — Luke D Ratcliffe
(74) *Attorney, Agent, or Firm* — WPAT, PC

(57) ABSTRACT

An image ranging system has a light source module having a light source diode and a light source lens, and an image sensing module, placed near the light source, having an image sensing device and an image sensing lens. An optical signal emitted from the light source diode passes through the light source lens with a luminous intensity profile which is characterized by intensity $I_1$ and then reaches an object. A reflection signal is generated by the object. The relationship between the intensity $I_1$ and the emission angle $\theta$ of the optical signal is $I_1 = 1/\cos^7\theta$. The reflection signal into the image source lens has an incident angle $\theta$ the same as the emission angle of the optical signal, and images the object onto the image sensing device. The ratio of the height of object image to the effective focal length of image sensing lens is proportional to $\sin\theta$.

8 Claims, 6 Drawing Sheets

(51) Int. Cl.
　　*G01S 17/89*　　　(2006.01)
　　*G06F 3/01*　　　(2006.01)

(56) References Cited

U.S. PATENT DOCUMENTS

| | | | |
|---|---|---|---|
| 8,780,333 | B2 | 7/2014 | Lin et al. |
| 9,030,529 | B2 | 5/2015 | Chen et al. |
| 2012/0206706 | A1* | 8/2012 | Hsu .................. G01C 3/08 356/3 |
| 2013/0116049 | A1 | 5/2013 | Pellman et al. |
| 2013/0222550 | A1 | 8/2013 | Choi et al. |
| 2014/0368615 | A1 | 12/2014 | van Baar et al. |

FOREIGN PATENT DOCUMENTS

| | | |
|---|---|---|
| TW | 201122443 A | 7/2011 |
| TW | M499888 | 5/2015 |

OTHER PUBLICATIONS

Jochen Penne et al., "Robust real-time 3D respiratory motion detection using time-of-flight cameras," International Journal of Computer Assisted Radiology and Surgery, Nov. 2008, vol. 3, Issue 5, pp. 427-431. DOI: 10.1007/s11548-008-0245-2.

Victor Castañeda et al. "SLAM combining ToF and high-resolution cameras," Applications of Computer Vision (WACV), 2011 IEEE Workshop on, Kona, HI, 2011, pp. 672-678. doi: 10.1109/WACV.2011.5711569.

Andreas Kolb et al., "Time-of-Flight Cameras in Computer Graphics," Institute of Computer Science, Christian-Albrechts-University Kiel, Germany, Proc. Eurographics (State Art Re.) Nov. 2008; 2009. DOI: 10.1111/j.1467-8659.2009.01583.x.

Dirk Holz et al., "Towards Semantic Scene Analysis with Time-of-Flight Cameras," RoboCup 2010: Robot Soccer World Cup XIV, vol. 6556 of the series Lecture Notes in Computer Science pp. 121-132. DOI: 10.1007/978-3-642-20217-9_11.

Taiwan Intellectual Property Office, "Office Action", dated Sep. 9, 2016.

* cited by examiner

IMAGE RANGING SYSTEM, LIGHT SOURCE MODULE AND IMAGE SENSING MODULE

CROSS REFERENCE TO RELATED APPLICATION

The present application is based on, and claims priority from, Taiwan (International) Application Serial Number 104136882, filed on Nov. 9, 2015, the disclosure of which is hereby incorporated by reference herein in its entirety.

TECHNICAL FIELD

The present disclosure relates to an image ranging system, a light source module and an image sensing module.

BACKGROUND

Recently, the demand in thinning wearable devices has been arising. Also, the demand in hand gesture recognition is now more than that in touch screens. Hence, manufacturers in the imaging art are all enthusiastic about the lens module technology in detecting the depth of field.

However, the conventional touch screen can't be applied to detect the change in height in the Z axial direction. Hence, only 2D manipulations are relevant to the touch screen. Namely, 3D manipulations, such as the rotation of a 3D model, can not be performed anyway on the touch screen.

Referring now to FIG. 9, a conventional image ranging system is schematically shown. An infrared signal emitted from a light source 1 is projected onto the object 2, which can be seen as an object to be irradiated by a point light source. The illuminance of the object 2 is inversely proportional to the transmission distance squared and is proportional to cosine value of the incident angle of the light. By treating the reflecting surface of the object 2 as a Lambertian surface, the intensity of the reflected light from the object 2 would be proportional to the cosine value of the reflection angle of the light. The reflected light can be received by an image sensing element placed near the light source. The illuminance of the image sensing element is inversely proportional to the transmission distance squared and is proportional to cosine value of the incident angle of the light. The image sensing element can receive the reflected lights from both the edge and the center of the object 2. The corresponding illuminance ratio would be:

$$\cos^3\theta \times \cos\theta \times \cos^3\theta = \cos^7\theta$$

in which $\theta$ is the included angle between the connecting line of the light source 1 and the edge of the object 2 and the normal line of the object 2 which passes through the light source.

In the conventional design, the infrared light source is designed to have a luminous intensity profile characterized by an intensity $I_0 = 1/(\cos\theta)^4$. Therefore, the illuminance ratio of the light from the edge of the object 2 and the light from the center of the object 2 received by the image sensing element would be:

$$(1/(\cos\theta)^4) \times \cos^7\theta = \cos^3\theta,$$

in which $\theta$ is the included angle between the connecting line of the light source 1 and the edge of the object 2 and the normal line of the object 2 which passes through the light source.

Obviously, the illuminance distribution is thus not uniform.

In addition, referring to FIG. 10, when the included angle $\theta$ of a connecting line of the object 2 and the lens 3 and an optical axis of the image sensing lens 3 is small, the distance z' between the object 2 and the image sensing lens 3 can be calculated by using the time of flight (TOF) technique, which is approximated to be the horizontal distance z between the object 2 and the image sensing lens 3. At this time, considering that the distance z between the object 2 and the image sensing lens 3 is much greater than the effective focal length f of the image sensing lens 3, then the imaging position of the object 2 would be about on the focal plane of the image sensing lens 3, and thus the vertical distance H of the object 2 with respect to the image sensing lens 3 would be calculated as:

$$H \approx z \times \tan\theta = z \times (h/f)$$

However, in the case that the angle $\theta$ of the connecting line of the object 2 and the lens 3 and an optical axis of the image sensing lens 3 is larger, the distance z' between the object 2 and the image sensing lens 3, calculated by the time of flight (TOF) technique, would be far away from the distance z, and then the vertical distance H shall be calculated as:

$$H = z' \times \tan\theta = (z/\cos\theta) \times (h/f)$$

Therefore, it is apparent that the conventional design upon the approximation assumption for the distance z' cannot accurately calculate the 3D depth of field for the object.

SUMMARY

In one embodiment of this disclosure, an image ranging system, applicable to detect 3D information of depth of field of an object, comprises:

at least one light source module, having a light source diode and a light source lens, an optical signal emitted from the light source diode passing through the light source lens with a luminous intensity profile which is characterized by an intensity $I_1$ and then reaching the object, the object reflecting the optical signal and thus generating a reflection signal, relationship between the intensity $I_1$ and an emission angle $\theta$ of the optical signal being as $I_1 = 1/\cos^7\theta$; and at least one image sensing module placed near the light source, having an image sensing element and an image sensing lens, the reflection signal irradiating the image sensing lens at an angle the same as the emission angle $\theta$ of the optical signal and forming an image of the object on the image sensing element, a ratio ($h_1/f$) of an imaged height $h_1$ of the image to an effective focal length f of the image sensing lens being proportional to $\sin\theta$ In one embodiment of this disclosure, a light source module comprises:

a light source diode for emitting an optical signal; and a light source lens, the optical signal passing through the light source lens with a luminous intensity profile which is characterized by an intensity $I_1$ and then reaching the object, the object reflecting the optical signal and thus generating a reflection signal, relationship between the intensity $I_1$ and an emission angle $\theta$ of the optical signal being as $I_1 = 1/\cos^7\theta$.

In one embodiment of this disclosure, an image sensing module comprises:

an image sensing element for forming thereon an image of an object; and an image sensing lens, providing a reflection signal to irradiate the image sensing lens, the reflection signal being generated by an optical signal irradiating the object, the reflection signal irradiating the image sensing lens at an incident angle θ so as to form an image of the object on the image sensing element, a ratio ($h_1/f$) of a imaged height $h_1$ of the image to an effective focal length f of the image sensing lens being proportional to sin θ.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
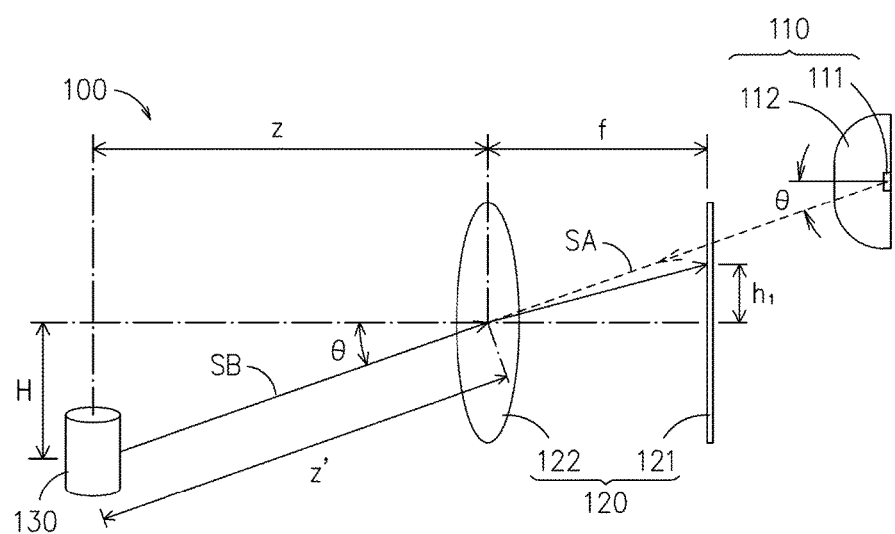
FIG. 1 is a schematic view of an image ranging system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, the image ranging system 100 includes a light source module 110 and an image sensing module 120, and is applicable to sense a 3D depth of field of an object 130. Also, the light source lens 110 and the image sensing module 120 can be manufactured by the same process, such as a manufacturing process of the wafer-level lens.

The light source module 110 includes a light source diode 111 and a light source lens 112, in which the light source diode 111 can be a laser chip or an LED chip. The light source diode 111 can emit an optical signal SA, of which the light source type can be an infrared light, a visible light or a UV light and can be one of a single-pulse signal, a short-pulse signal or a continuous-pulse signal. For example, by having an infrared light as the optical signal, the wavelength can be ranged from 700-1400 nm. Firstly the optical signal SA passing through the light source lens 112 to irradiate the object 130, and then a reflection signal SB is generated from the object 130. The relationship between the intensity $I_1$ and the emission angle θ of the optical signal SA is $I_1$=1/$\cos^7θ$.

The image sensing module 120 includes an image sensing element 121 and an image sensing lens 122. The reflection signal SB would irradiate the image sensing lens 122 at an incident angle the same as the emission angle θ from the optical signal SA. An image of the object 130 would then formed at the image sensing element 121, in which the ratio ($h_1/f$) of the imaged height $h_1$ of the image to the effective focal length f of the image sensing lens 122 would be proportional to the value of sin θ. Or, in a concise way, the image sensing lens 122 can be called as a sin θ lens to feature the proportional relationship between the imaged height $h_1$ of the object 130 and the sin θ value at the image sensing element 121.

The image sensing module 120 applies the time of flight (TOF) technique to calculate the information of depth of field between the object 130 and the image sensing lens 122.

In this embodiment, a single light source module 110 and a single image sensing module 120 are typically applied. However, it shall be understood that the technique of this disclosure can also apply multiple light source modules and multiple image sensing modules.

In this disclosure, the luminous intensity profile of the optical signal SA is particularly characterized by the intensity $I_1$=1/$\cos^7θ$, and the signal intensity received at the image sensing element 121 from a reflection by the object 130 can be expressed as:

$$(1/\cos^7θ) \times (\cos^7θ) = 1$$

Figure 2:
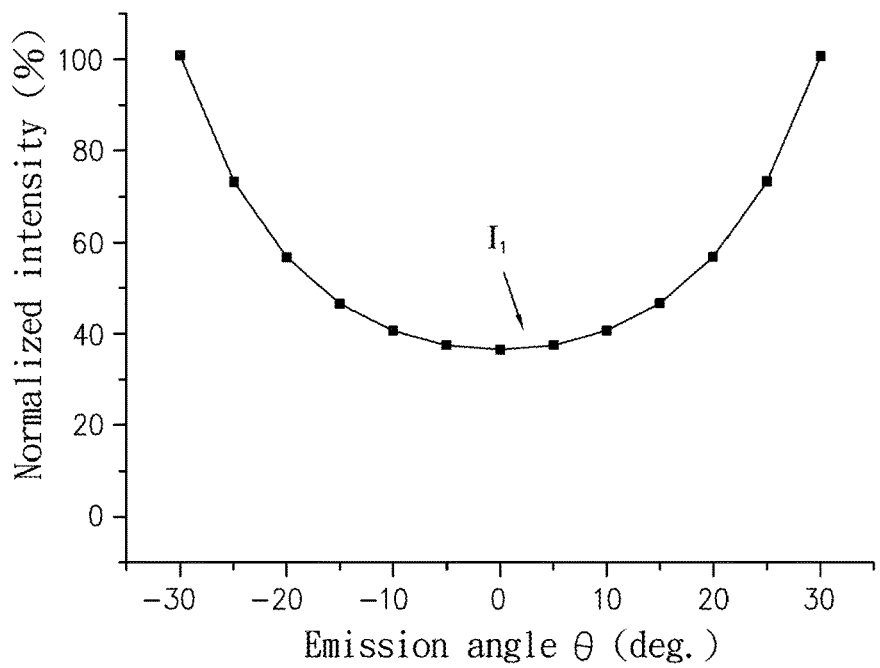
FIG. 2 is a plot of the normalized intensity of $I_1$(=1/$\cos^7θ$) for optical signals.

At this time, the illuminance at the image sensing element 121 for the reflection signals SB received from the edge and the center of the object 130 are not related to the incident angle θ, and thus the sensitivity for receiving the signals can be increased. For considering the emission angle of the light source within the range of −30° to 30°, the normalized intensity $I_1$(=1/$\cos^7θ$) are shown in FIG. 2, in which the intensity at the center is about 36.5% of that at the edge.

Further, as shown in FIG. 1, in the case that the height $h_1$ of the imaged object 130 at the image sensing element 121 is reduced without changing the effective focal length f of the image sensing lens 122, then the relation in between can be expressed as:

$$h_1/f = \sin θ$$

By applying the time of flight (TOF) technique to calculate:

$$(z/\cos θ) \times (h_1/f) = (z/\cos θ) \times \sin θ = z \times \tan θ = H$$

Then, a more accurate vertical distance H for the object 130 with respect to the image sensing lens 122 can be derived so as to enhance the computational accuracy upon the information of depth of field for the image sensing element 121.

In addition, the image sensing lens can also be designed in accordance with the following equation.

$$(h_1/f) = A \times \sin θ$$

in which the A is an integer. The vertical height H of the object 130 with respect to the image sensing lens 122 can computed as:

$$(z/\cos\theta) \times (h_1/f) \times (z/\cos\theta) \times A \times \sin\theta = A \times H$$

Then, the accurate vertical distance H can be derived as:

$$H = z' \times (h_1/f) \times (1/A)$$

According to the aforesaid equations, the light source module is targeted to be designed so as to generate its normalized intensity close to the intensity curve of $1/\cos^7\theta$.

Figure 3:
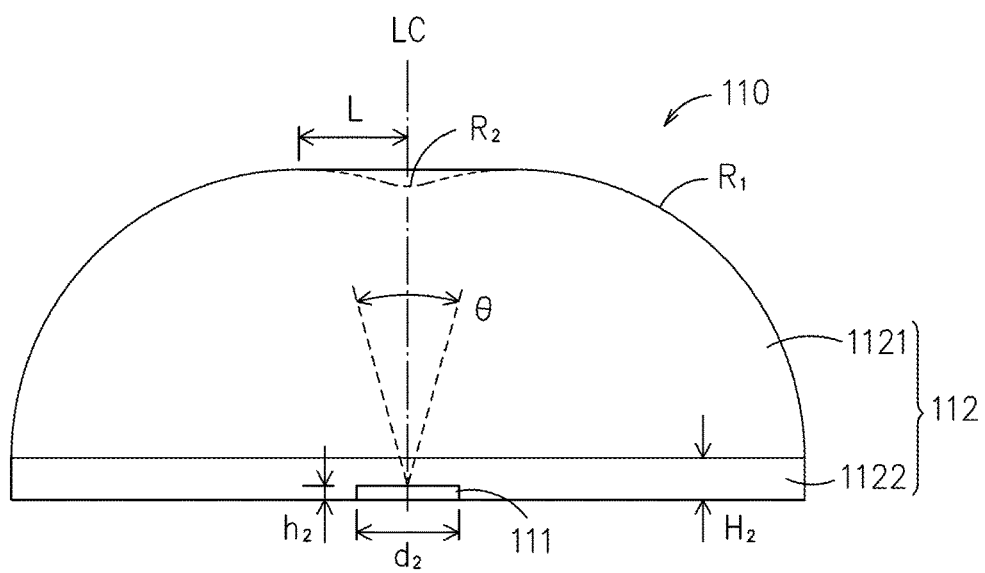
FIG. 3 is a schematic view of an embodiment of the light source module in accordance with this disclosure.

Referring now to FIG. 3, an embodiment of the light source module is schematically shown. In this light source module 100, the light source diode 111 is packed inside the light source lens 112. The package material can be a silicon material with a refractive index of 1.41. The emission angle θ of the optical signal SA emitted by the light source diode 111 can have an range of −30°≤θ≤30°. The light source diode 111 has a width and a height of $d_2$ and $h_2$, respectively. The light source lens 112 includes a spherical portion 1121 and a cylindrical portion 1122. The spherical portion 1121 is formed by rotating a curve line segment 360° around a normal line LC passing through the center of the light source diode 111. The curve line segment is a connection of a first circular arc ($R_1$ of FIG. 3) and a second circular arc ($R_2$ of FIG. 3), in which the first circular arc and the second circular arc have different radii of curvature. The radius of curvature of the first circular arc is $R_1$, and the radius of curvature of the second circular arc is $R_2$. The height of the cylindrical portion 1122 is $H_2$. The first circular arc is a ¼ circle with a highest point as one end point. The horizontal distance from the highest point of the first circular arc to the lowest point of the second circular arc is L. The top surface of the cylindrical portion 1122 is connected with the bottom surface of the spherical portion 1121. In this embodiment, following constraints prevail: $R_1 \geq d_2$, $R_2 \leq d_2$, $h_2 \leq H_2$, $0.66 \leq L/d_2 \leq 1.73$ and $0.01 \leq R_2/R_1 \leq 0.5$.

Figure 4:
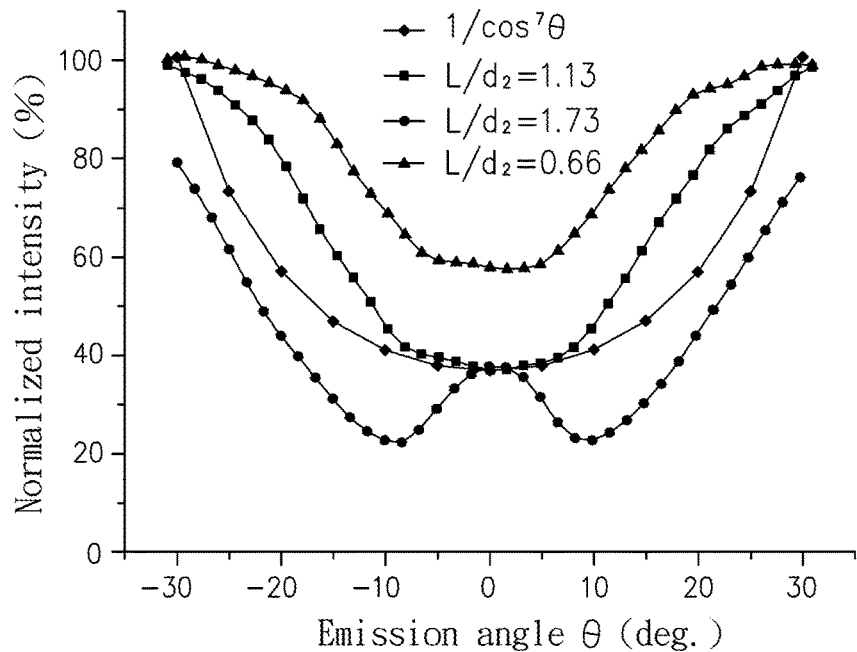
FIG. 4, FIG. 5 and FIG. 6 demonstrates normalized intensities for optical signals with respect to different embodiments of the light source module as well as the intensity curve of 1/$\cos^7θ$ in accordance with this disclosure.
Figure 5:
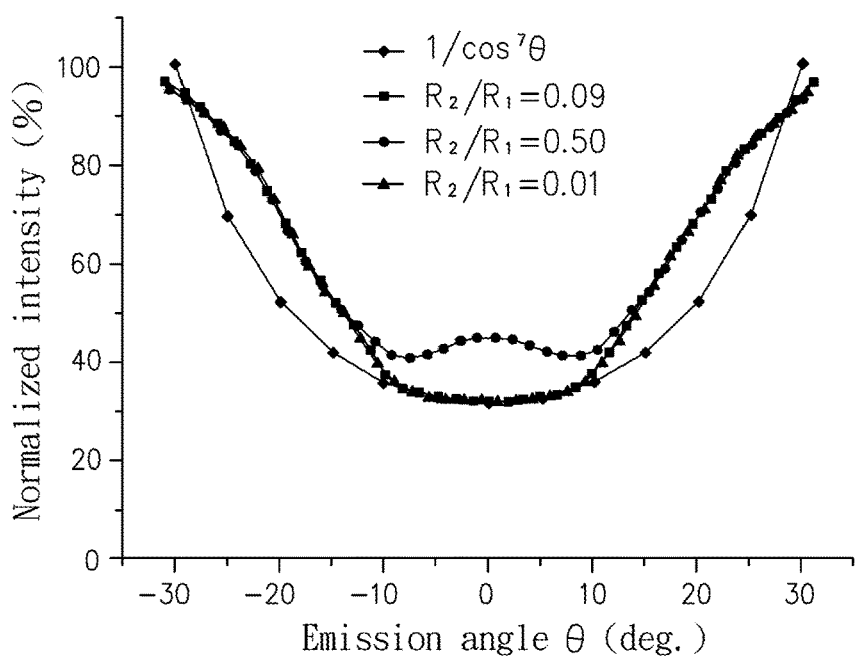
Figure 6:
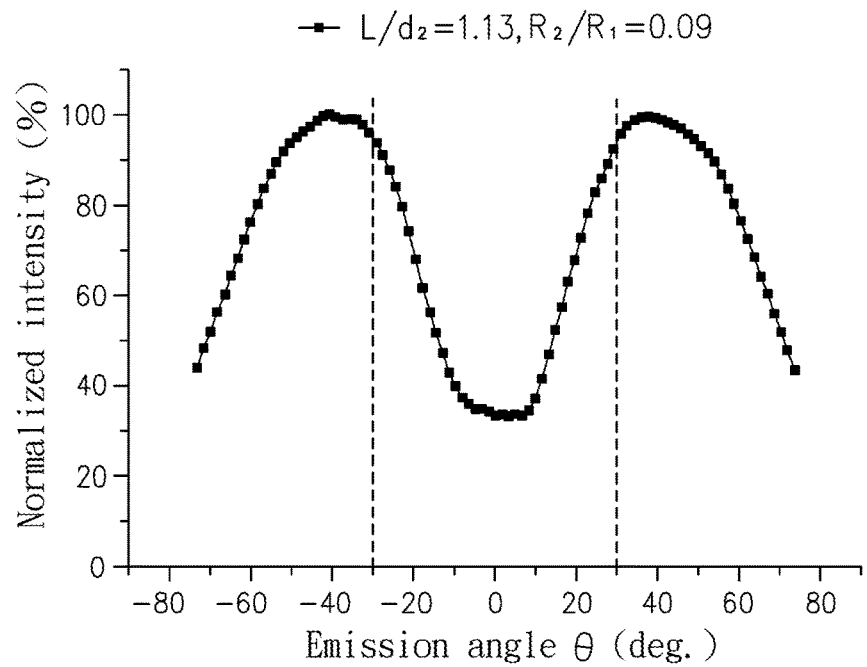

Referring now to FIG. 4 to FIG. 6, various relations between the normalized intensities and the emission angles of the optical signals SA are plotted respectively for the application having a common silicon packing material with a 1.41 refractive index and $R_1$, $R_2$, $h_2$ to be 3.5 mm, 0.3 mm, 0.5 mm, respectively. In FIG. 4, typical cases for $1/\cos^7\theta$, $L/d_2 = 1.13$, $L/d_2 = 1.73$ and $L/d_2 = 0.66$ are analyzed. In FIG. 5, typical cases for $1/\cos^7\theta$, $R_2/R_1 = 0.09$, $R_2/R_1 = 0.50$ and $R_2/R_1 = 0.01$ are analyzed. In FIG. 6, typical cases for $L/d_2 = 1.13$ and $R_2/R_1 = 0.09$ are analyzed.

As shown in FIG. 4, when $L/d_2 = 1.13$, the normalized intensity for the light passing through the lens is close to the intensity curve of $1/\cos^7\theta$. For the emission angles within the range of −30° to 30°, the intensity at the center is about 36.5% of that at the edge. While $L/d_2 = 1.73$ or 0.66, the normalized intensity for the light passing through the lens is farther to the intensity curve of $1/\cos^7\theta$, but still within the acceptable range. For the emission angles within the range of −30° to 30°, the intensity at the center is about 57.4% or 37.3%, respectively, of that at the edge. Based on results of FIG. 4, by fixing the $L/d_2$ to be 1.13 to analyze relationship between $R_2/R_1$ and the normalized intensity for the light passing through the lens, then corresponding results are shown in FIG. 5. In FIG. 5, when $R_2/R_1 = 0.09$ or 0.01, the normalized intensity for the light passing through the lens is close to the intensity curve of $1/\cos^7\theta$. While $R_2/R_1 = 0.50$, the normalized intensity for the light passing through the lens is farther to the intensity curve of $1/\cos^7\theta$, but still within the acceptable range. Based on FIG. 4 and FIG. 5, while L/d2 and $R_2/R_1$ are 1.13 and 0.09, respectively, then the normalized intensity for the light passing through the lens are plotted in FIG. 6. It is found that, while −30°≤θ≤30°, the normalized intensity for the light passing through the lens is close to the intensity curve of $1/\cos^7\theta$. However, while θ<−30° or 30°<θ, the normalized intensity reduces gradually. Therefore, for considering an effective range of −30°≤θ≤30°, then loss of the energy can be substantially reduced.

Based on the aforesaid equations, following designs for the infrared image sensing lens are to deflect the light by closing to sin θ.

Figure 7:
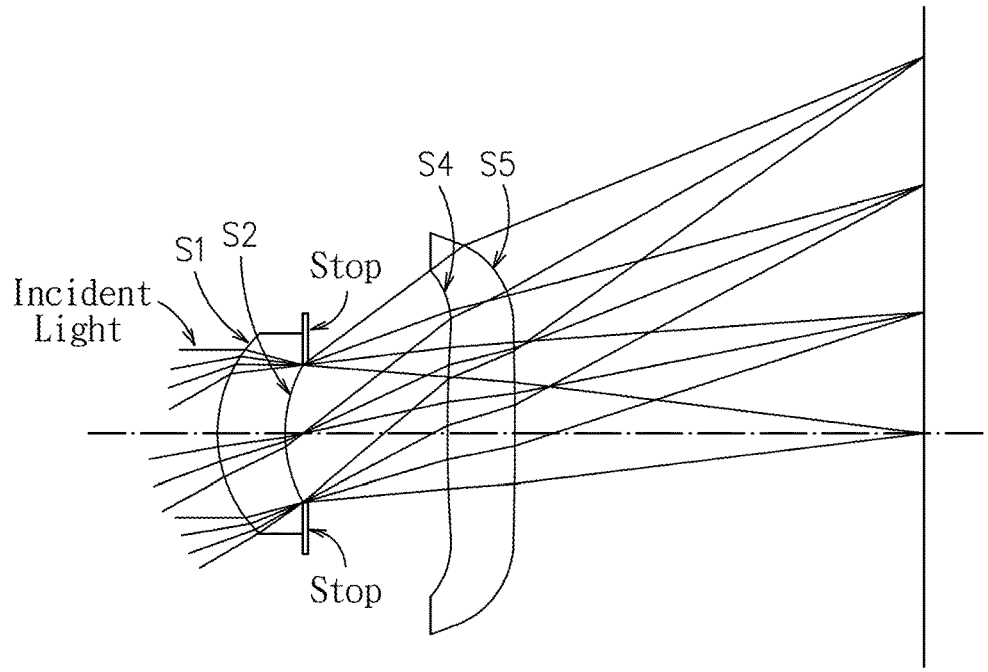
FIG. 7 is a schematic view of an embodiment of the infrared image sensing lens in accordance with this disclosure.

In this embodiment, the infrared image sensing lens 122 includes two aspherical lenses, as shown in FIG. 7. With a field of view (FOV) of the infrared image sensing lens of 60°, then optimal structural parameters are listed as follows in Table 1.

TABLE 1

Structural parameters for lens

| Surface No. | Surface type | Radius (mm) | Thickness (mm) | Refractive index | Abbe number | Hole size (mm) |
|---|---|---|---|---|---|---|
| Object | Sphere | ∞ | ∞ | | | |
| S1 | Asphere | 0.572227 | 0.274426 | 1.52240 | 47.0 | 0.397532 |
| S2 | Asphere | 0.668474 | 0.068000 | | | 0.280000 |
| Stop | Sphere | ∞ | 0.578072 | | | 0.279029 |
| S4 | Asphere | 3.315834 | 0.269277 | 1.51756 | 54.2 | 0.651558 |
| S5 | Asphere | 15.161383 | 1.644596 | | | 0.780156 |
| Image | Sphere | ∞ | 0 | | | 1.519134 |

For the embodiment as shown in FIG. 7, aspherical coefficients for the two aspherical lenses are listed as follows in Table 2.

TABLE 2

Aspherical coefficients

| Surface No. | K | A4 | A6 | A8 | A10 | A12 | A14 |
|---|---|---|---|---|---|---|---|
| S1 | 0.007418 | 0.227046 | −2.643816 | 36.974288 | −202.823115 | 649.724532 | −812.414762 |
| S2 | 1.386604 | 0.266387 | −4.248126 | 37.882704 | 652.321651 | −11353.019776 | 47515.435394 |
| S4 | −344.118829 | 0.814201 | −10.218975 | 44.254572 | −90.760607 | 39.840211 | 49.329682 |
| S5 | −5.646464e+029 | 0.018600 | −2.249391 | 4.511813 | 0.275063 | −14.741958 | 10.983132 |

Figure 8:
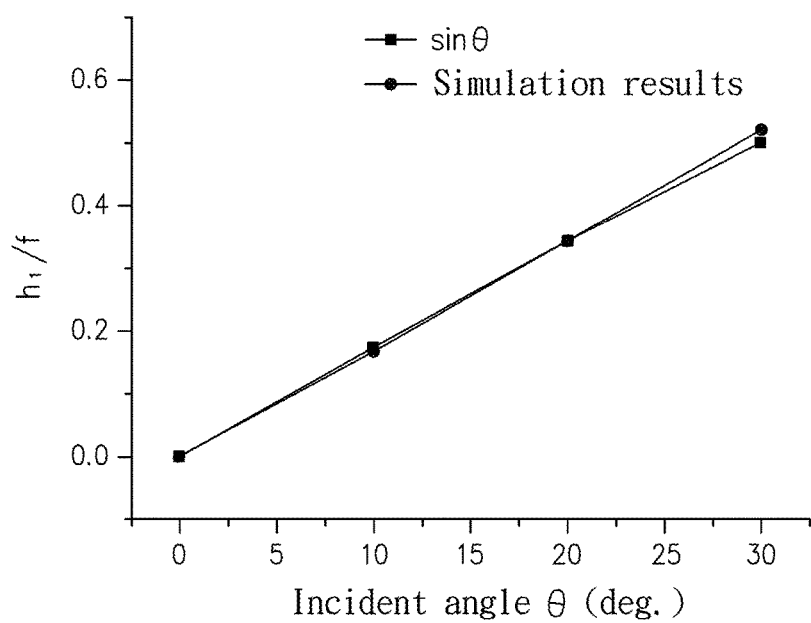
FIG. 8 is a plot demonstrating the relationship between the ratio ($h_1/f$) of the imaged height $h_1$ of the image to the effective focal length f of the image sensing lens) as well as the sin θ curve in accordance with this disclosure.
Figure 9:
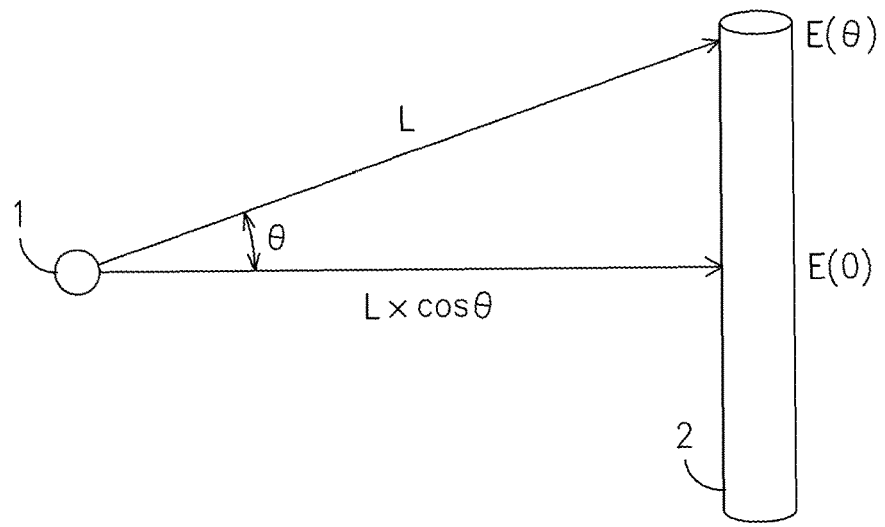
FIG. 9 is a schematic view of a conventional image ranging system.
Figure 10:
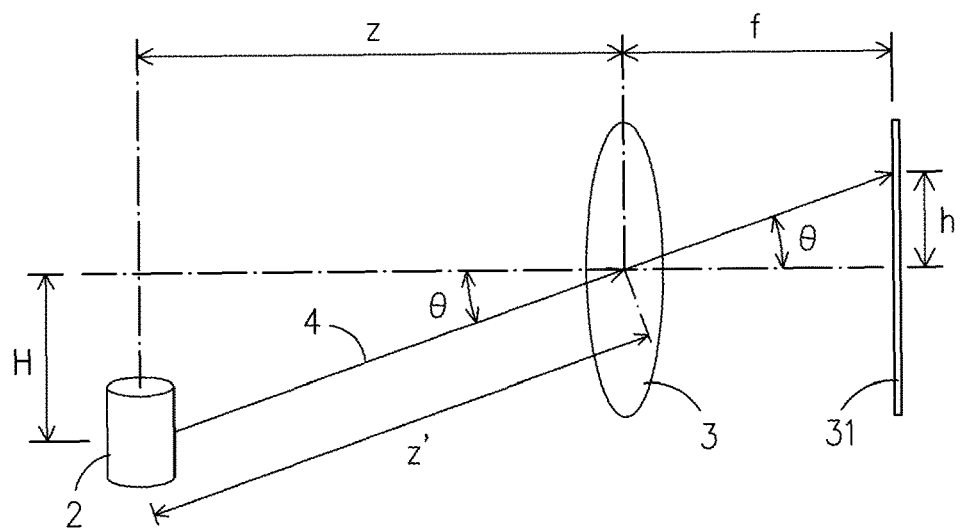
FIG. 10 is a schematic view of a conventional system for sensing a 3D depth of field for an object.

As shown in FIG. 8, while the effective focal length f of the lens is 2.91 mm, the relationship ($h_1/f$) between the imaged height and the effective focal length is plotted. It is found that, in FIG. 8, the design satisfies the sin θ lens.

In summary, the image ranging system provided by this disclosure adopts at least one light source module and at least one image sensing module placed near the light source. In addition, the time of flight (TOF) technique is applied to measure the distance between the object and the lens. In particularly, the luminous intensity profile of the optical signal SA is particularly characterized by the intensity $I_1$. The relationship between the intensity $I_1$ and the emission angle θ of the optical signal SA is $I_1 = 1/\cos^7 θ$, the ratio ($H_1/f$) of the imaged height $h_1$ of the image to the effective focal length f of the image sensing lens is designed to be proportional to sin θ, in which θ is the incident angle of the reflection signal onto the image sensing lens. Upon such an arrangement, the light source lens and the image sensing lens can be optimized so as to enhance the sensitivity of the image sensing element and further to increase the accuracy of 3D ranging. Thus, the aforesaid disadvantage in applying the proposed image ranging system can be overcome.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all relationships to those illustrated in the drawings and described in the specification are intended to be encompassed by the present disclosure.

What is claimed is:

1. An image ranging system, applicable to detect 3D information of depth of field of an object, comprising:
   at least one light source module, having a light source diode and a light source lens, an optical signal emitted from the light source diode passing through the light source lens with a luminous intensity profile which is characterized by an intensity $I_1$ and then reaching the object, the object reflecting the optical signal and thus generating a reflection signal, relationship between the intensity $I_1$ and an emission angle θ of the optical signal being as follows:

$I_1 = 1/\cos^7 θ$; and at least one image sensing module placed near the light source, including an image sensing element and an image sensing lens, the reflection signal irradiating the image sensing lens at an angle the same as the emission angle θ of the optical signal and forming an image of the object on the image sensing element, a ratio of an imaged height of the image to an effective focal length of the image sensing lens being proportional to sin θ.

2. The image ranging system of claim 1, wherein the light source diode is one of a laser chip and an LED chip.

3. The image ranging system of claim 1, wherein the light source type is one of an infrared light, a visible light and an UV light.

4. The image ranging system of claim 1, wherein a wavelength of the optical signal is ranged from 700-1400 nm.

5. The image ranging system of claim 1, wherein the optical signal is one of a single-pulse signal, a short-pulse signal and a continuous-pulse signal.

6. The image ranging system of claim 1, wherein the light source diode is packaged inside the light source lens, the light source lens further including a spherical portion and a cylindrical portion, the spherical portion being formed by rotating a curve line segment 360° around a normal line passing a center of the light source diode, the curve line segment being a connection of a first circular arc and a second circular arc with different radii of curvature, the first circular arc being a ¼ circle with a highest point as one end point, a top surface of the cylindrical portion being connected with a bottom surface of the spherical portion.

7. The image ranging system of claim 6, wherein the light source diode has a width and a height as $d_2$ and $h_2$, respectively, the first circular arc has a radius of curvature $R_1$, the second circular arc has a radius of curvature $R_2$, the cylindrical portion has a height $H_2$, a horizontal distance between the highest point of the first circular arc and a lowest point of the second circular arc is L, fulfilling constraint equations of: $R_1 \geq d_2$, $R_2 \leq d_2$, $h \leq H_2$, $0.66 \leq L/d_2 \leq 1.73$ and $0.01 \leq R_2/R_1 \leq 0.50$.

8. The image ranging system of claim 6, wherein the emission angle θ of the optical signal is ranged as $-30° \leq θ \leq 30°$.

* * * * *